(12) United States Patent
Barrett

(10) Patent No.: US 7,511,710 B2
(45) Date of Patent: Mar. 31, 2009

(54) THREE-DIMENSIONAL PROGRAM GUIDE

(75) Inventor: Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 10/303,488

(22) Filed: Nov. 25, 2002

(65) Prior Publication Data

US 2004/0103432 A1     May 27, 2004

(51) Int. Cl.
*G06T 15/00*     (2006.01)
*G06F 3/048*     (2006.01)

(52) U.S. Cl. ...................................... 345/419; 715/848
(58) Field of Classification Search ................. 345/650, 345/733; 725/52; 348/580
See application file for complete search history.

(56) References Cited

U.S. PATENT DOCUMENTS

| | | |
|---|---|---|
| 5,353,121 A | 10/1994 | Young et al. |
| 5,363,757 A | 11/1994 | Newsom |
| 5,388,990 A | 2/1995 | Beckman |
| 5,423,555 A | 6/1995 | Kidrin |
| 5,465,362 A | 11/1995 | Orton et al. |
| 5,465,363 A | 11/1995 | Orton et al. |
| 5,532,754 A | 7/1996 | Young et al. |
| 5,550,961 A | 8/1996 | Chimoto |
| 5,585,838 A | 12/1996 | Lawler et al. |
| 5,602,564 A | 2/1997 | Iwamura et al. |
| 5,603,507 A | 2/1997 | Tice |
| 5,604,857 A | 2/1997 | Walmsley |
| 5,619,250 A | 4/1997 | McClellan et al. |
| 5,675,828 A | 10/1997 | Stoel et al. |
| 5,689,628 A | 11/1997 | Robertson |
| 5,724,492 A | 3/1998 | Matthews, III et al. |
| 5,734,805 A | 3/1998 | Isensee et al. |
| 5,745,109 A * | 4/1998 | Nakano et al. ............... 715/838 |
| 5,793,382 A | 8/1998 | Yerazunis et al. |
| 5,812,123 A | 9/1998 | Rowe et al. |
| 5,812,142 A | 9/1998 | Small et al. |
| 5,823,879 A | 10/1998 | Goldberg et al. |
| 5,835,692 A | 11/1998 | Cragun et al. |
| 5,838,326 A | 11/1998 | Card et al. |
| 5,850,218 A | 12/1998 | LaJoie et al. |
| 5,861,885 A | 1/1999 | Strasnick et al. |
| 5,874,956 A | 2/1999 | LaHood |
| 5,880,725 A | 3/1999 | Southgate |

(Continued)

FOREIGN PATENT DOCUMENTS

EP         1093090        4/2001

OTHER PUBLICATIONS

Lira Nikolovska and Jacquelyn Martino, "Project Reports: Spatial Browsing to Retrieve Multimedia Information", IEEE MultiMedia archive, vol. 5, Issue 2 (Apr. 1998), pp. 78-83.*

(Continued)

*Primary Examiner*—Kimbinh T. Nguyen
*Assistant Examiner*—Daniel F. Hajnik
(74) *Attorney, Agent, or Firm*—Lee & Hayes, PLLC

(57)     ABSTRACT

A three-dimensional electronic program guide (EPG) is displayed as multiple two-dimensional areas within a three-dimensional television viewing environment. Each two-dimensional area contains a particular category of EPG data. A viewer navigates the three-dimensional EPG using an input device, such as a joystick or other game controller.

9 Claims, 6 Drawing Sheets

U.S. PATENT DOCUMENTS

| | | | |
|---|---|---|---|
| 5,880,733 A | 3/1999 | Horvitz et al. | |
| 5,905,523 A | 5/1999 | Woodfield et al. | |
| 5,912,664 A | 6/1999 | Eick et al. | |
| 5,945,976 A | 8/1999 | Iwamura et al. | |
| 5,999,944 A | 12/1999 | Lipkin | |
| 6,002,403 A | 12/1999 | Sugiyama et al. | |
| 6,008,803 A | 12/1999 | Rowe et al. | |
| 6,009,210 A | 12/1999 | Kang | |
| 6,014,142 A | 1/2000 | LaHood | |
| 6,028,600 A | 2/2000 | Rosin et al. | |
| 6,054,997 A | 4/2000 | Mirtich | |
| 6,061,064 A | 5/2000 | Reichlen | |
| 6,084,556 A | 7/2000 | Zwern | |
| 6,088,032 A | 7/2000 | Mackinlay | |
| 6,100,906 A | 8/2000 | Asaro et al. | |
| 6,127,990 A | 10/2000 | Zwern | |
| 6,130,726 A | 10/2000 | Darbee et al. | |
| 6,133,914 A | 10/2000 | Rogers et al. | |
| 6,166,748 A | 12/2000 | Van Hook et al. | |
| 6,167,188 A | 12/2000 | Young et al. | |
| 6,181,343 B1 | 1/2001 | Lyons | |
| 6,184,847 B1 | 2/2001 | Fateh et al. | |
| 6,278,466 B1 | 8/2001 | Chen | |
| 6,285,362 B1 * | 9/2001 | Kikuchi et al. | 715/733 |
| 6,337,688 B1 | 1/2002 | Berstis | |
| 6,346,956 B2 | 2/2002 | Matsuda | |
| 6,349,419 B1 | 2/2002 | Chiang | |
| 6,351,261 B1 | 2/2002 | Reichlen et al. | |
| 6,378,035 B1 | 4/2002 | Parry et al. | |
| 6,421,067 B1 * | 7/2002 | Kamen et al. | 715/719 |
| 6,445,398 B1 | 9/2002 | Gerba et al. | |
| 6,446,262 B1 | 9/2002 | Malaure et al. | |
| 6,452,609 B1 | 9/2002 | Katinsky et al. | |
| 6,452,611 B1 | 9/2002 | Gerba et al. | |
| 6,498,895 B2 | 12/2002 | Young et al. | |
| 6,505,194 B1 | 1/2003 | Nikolovska et al. | |
| 6,526,577 B1 | 2/2003 | Knudson et al. | |
| 6,535,920 B1 | 3/2003 | Parry et al. | |
| 6,553,178 B2 | 4/2003 | Abecassis | |
| 6,567,103 B1 | 5/2003 | Chaudhry | |
| 6,628,307 B1 | 9/2003 | Fair | |
| 6,636,246 B1 | 10/2003 | Gallo et al. | |
| 6,661,426 B1 | 12/2003 | Jetha et al. | |
| 6,670,971 B1 * | 12/2003 | Oral | 715/769 |
| 6,674,484 B1 * | 1/2004 | Boland et al. | 348/580 |
| 6,754,715 B1 | 6/2004 | Cannon et al. | |
| 6,754,906 B1 | 6/2004 | Finseth et al. | |
| 6,765,567 B1 | 7/2004 | Roberson et al. | |
| 6,785,667 B2 | 8/2004 | Orbanes et al. | |
| 6,806,889 B1 * | 10/2004 | Malaure et al. | 715/733 |
| 6,836,274 B1 * | 12/2004 | Kikinis | 715/716 |
| 6,910,191 B2 | 6/2005 | Segerberg et al. | |
| 6,934,964 B1 | 8/2005 | Schaffer et al. | |
| 6,952,799 B2 | 10/2005 | Edwards et al. | |
| 7,030,890 B1 | 4/2006 | Jouet et al. | |
| 7,036,092 B2 | 4/2006 | Sloo et al. | |
| 7,047,550 B1 | 5/2006 | Yasukawa et al. | |
| 7,281,199 B1 | 10/2007 | Nicol et al. | |
| 2002/0059603 A1 | 5/2002 | Kelts | |
| 2002/0122656 A1 | 9/2002 | Gates et al. | |
| 2002/0166123 A1 | 11/2002 | Schrader et al. | |
| 2003/0070183 A1 | 4/2003 | Pierre et al. | |
| 2003/0097659 A1 | 5/2003 | Goldman | |
| 2003/0135860 A1 | 7/2003 | Dureau | |
| 2003/0142127 A1 | 7/2003 | Markel | |
| 2003/0167466 A1 * | 9/2003 | Nakamura et al. | 725/39 |
| 2004/0103432 A1 | 5/2004 | Barrett | |
| 2005/0097603 A1 * | 5/2005 | Kikinis | 725/44 |

OTHER PUBLICATIONS

Harry van Vliet, "Where Television and Internet meet . . . New Experiences for rich media", Published in eView, Dec. 2001, Enschede, The Netherlands.*

"Datacasting", Idaho Public Television, Public Television in the Digital Age, Aug. 10, 2000, website: http://www.idahoptv.org/dtv/datacasting/index.htm, web pp. 1-5, 19 total printed pages.

Eronen, et al., "User Interfaces for Digital Television: a Navigator Case Study", ACM, 2000, pp. 276-279.

Kaptelinin, et al., "Transient Visual Cues for Scrolling: An Empirical Study", ACM, 2002, pp. 620-621.

Kim, et al., "Interactive broadcast terminal system using MPEG-2 and MPEG-4", 2000 IEEE International Symposium on Circuits and Systems, May 2000, vol. 3, pp. 682-685.

Kruger, B., "EPG as crystallization core for free-TV and new markets", IEEE Half-Day Colloquium on Navigation in Entertainment Services (Ref. No. 1998/247), Jan. 1998, pp. 301-314.

Tan, et al., "Exploring 3D Navigation: Combining Speed-coupled Flying with Orbiting", ACM, vol. 3, No. 1, 2001, pp. 418-425.

Takamatsu, et al., "Space Browsing Interface Based on Head Posture Information", Proceedings 3rd Asia Pacific Computer Human Interaction, Jul. 15-17, 1998, pp. 298-303.

* cited by examiner

THREE-DIMENSIONAL PROGRAM GUIDE

RELATED APPLICATIONS

This application is related to the following U.S. Patent Application:

application Ser. No. 10/303,507, filed Nov. 25, 2002, entitled "Three-Dimensional Television Viewing Environment", and naming Peter T. Barrett as inventor.

TECHNICAL FIELD

This invention relates to electronic program guides and, in particular, to a three-dimensional electronic program guide.

BACKGROUND

With technological advances, television viewing has become more interactive. Many television viewing systems include a client device, such as a set-top box, that provides access to a programming guide through a user interface displayed on the television. Typically, a viewer accesses the programming guide by tuning to a particular channel over which the program guide data is being transmitted. Traditional electronic program guides display program data in a grid organized according to broadcast channel and time of day. The user can scroll through the program guide, identify a program of interest, and then tune to the channel on which the interesting program is being broadcast. The programming guide user interface may also display advertisements and/or program recommendations in addition to the program guide data.

Client devices that provide viewer interaction with a television may also include gaming consoles, such as the Microsoft Xbox™ gaming system. These gaming consoles support interactive three-dimensional video games, and may also include one or more tuners, such that the gaming consoles may replace traditional television set-top boxes. As such, the three-dimensional graphics functionality supported by the gaming console (or any other advanced client device, such as an advanced television set-top box or personal computer) may be utilized to enhance the television viewing experience by rendering an intuitive, three-dimensional electronic program guide.

SUMMARY

A three-dimensional electronic program guide (EPG) is described. EPG data is categorized according to similarities between programs. The similarities may be based on genre, content, target audience, and so on. Categorized EPG data is rendered in multiple two-dimensional areas within a three-dimensional environment. Viewers can navigate the three-dimensional EPG using an input device such as a joystick.

BRIEF DESCRIPTION OF THE DRAWINGS

The same numbers are used throughout the drawings to reference like features and components.

DETAILED DESCRIPTION

The following discussion is directed to methods and systems that allow users to view media content and related information in a three-dimensional graphics environment. The three-dimensional television viewing environment described herein may be implemented using a client device with three-dimensional graphics capabilities configured to receive media content, such as broadcast television data or on-demand video. Media content, program guide data, program recommendations, advertisements, and any other related information is presented to a viewer within a three-dimensional viewing environment.

Three-Dimensional Presentation of Media Content and Data

Figure 1:
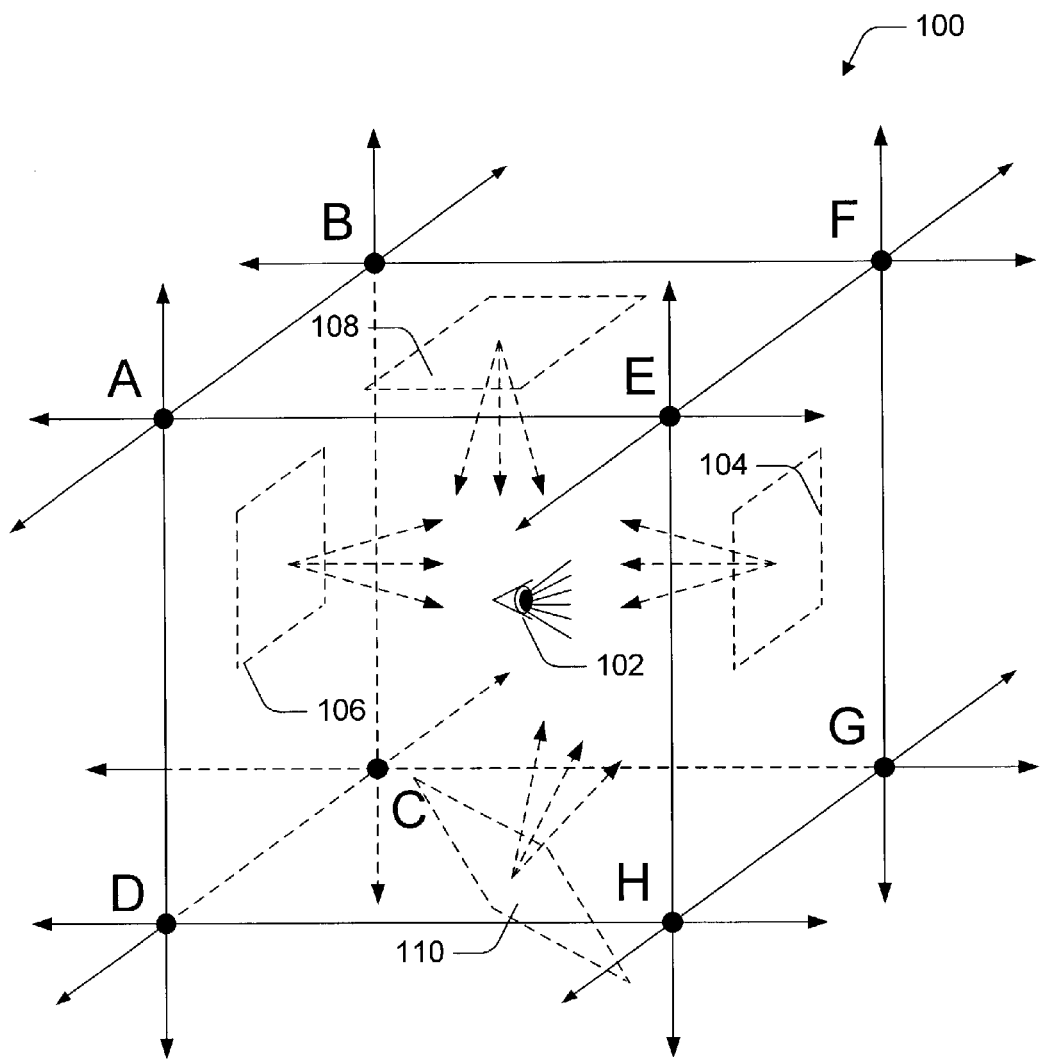
FIG. 1 illustrates a three-dimensional graphics environment.

FIG. 1 illustrates a three-dimensional viewing environment 100 in which media content and related information may be presented to a viewer. Points A, B, C, D, E, F, G, and H define a particular area within three-dimensional viewing environment 100 that extends substantially, if not infinitely, in each direction. An eye 102 represents a virtual location and viewing direction of a viewer within three-dimensional area 100. For example, as illustrated, the viewer is virtually located approximately equidistance from plane ABCD and from plane EFGH, and is looking toward plane EFGH. Two-dimensional area 104 lies within plane EFGH, and represents a two-dimensional area in which data, such as a broadcast television program, a program guide, advertisements, or program recommendations, may be presented. Similarly, two-dimensional area 106 lies within plane ABCD, and represents another two-dimensional area in which data may be presented. It is recognized that any number of data/content areas may be defined within three-dimensional environment 100. Furthermore, although data/content areas 104 and 106 are shown on parallel planes within environment 100, it is recognized that data/content areas may be defined on any plane within environment 100, and that planes containing defined two-dimensional areas may be at any angle to other planes containing defined two-dimensional areas. For example, area 108 is a two-dimensional area defined within a plane containing points A, B, F, and E and area 110 is a two-dimensional area defined within a plane that contains points A, C, and H.

A viewer interacts with viewing environment 100 using a television remote control, a joystick, game controller, or other input device to move and/or rotate the virtual location of the viewer 102 within the environment 100. For example, if a viewer is viewing a broadcast television program that is being rendered in area 104, the viewer can use a joystick to rotate the virtual location of the viewer 180 degrees to bring into view an electronic program guide being presented in area 106. As another example, if a viewer is viewing data that is being rendered in area 104, the viewer can user the joystick to move the virtual location of the viewer closer to (zoom in on) or back away from (zoom out on) the displayed data. Using an input device, a viewer can move and/or rotate the virtual location of the viewer 102 in any direction within the three-dimensional viewing environment 100.

Figure 2A:
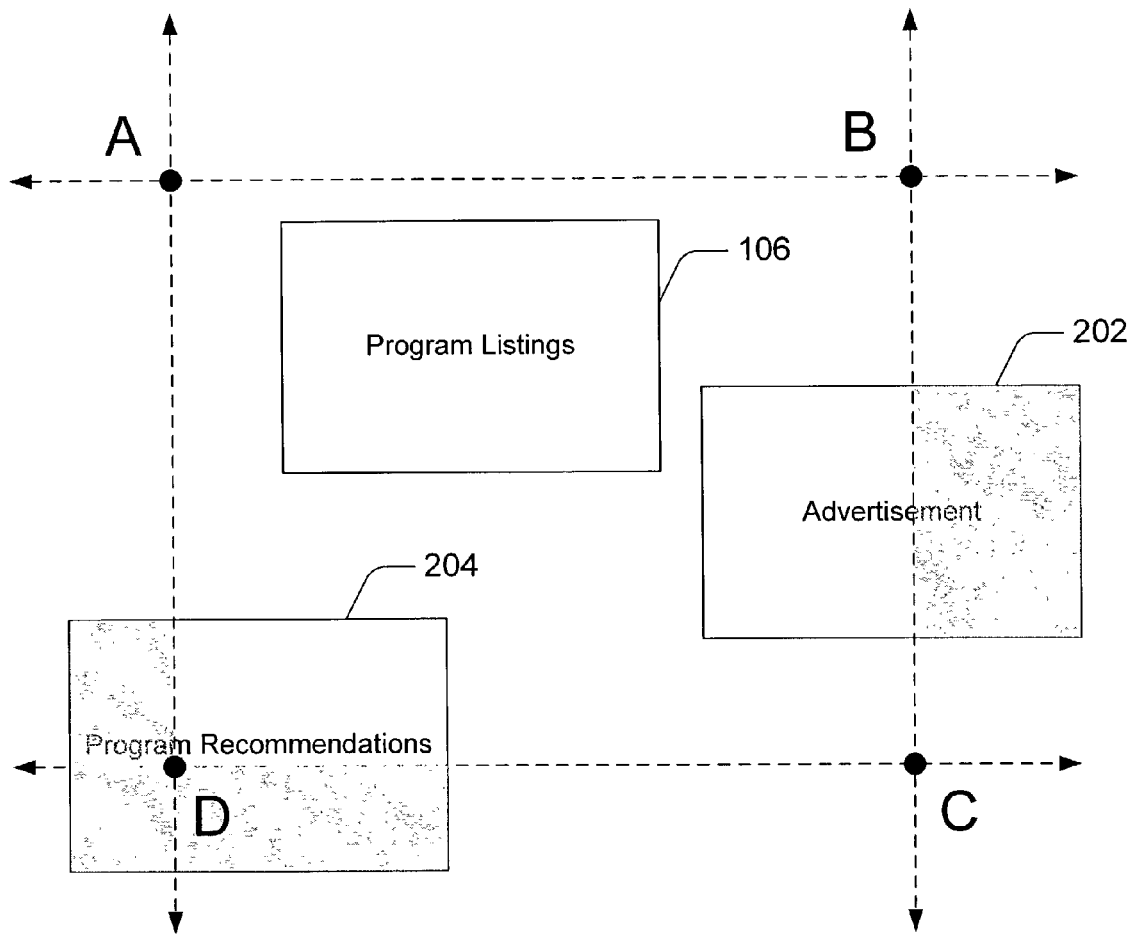
FIG. 2a illustrates a two-dimensional plane within the three-dimensional graphics environment.

FIG. 2a illustrates multiple data/content areas defined on a single plane within three-dimensional environment 100. As in FIG. 1, points A, B, C, and D define a two dimensional plane within three-dimensional environment 100. Furthermore, the rectangular area defined by points A, B, C, and D represents an area that is visible to a user through a display device, such as a television screen.

Figure 2B:
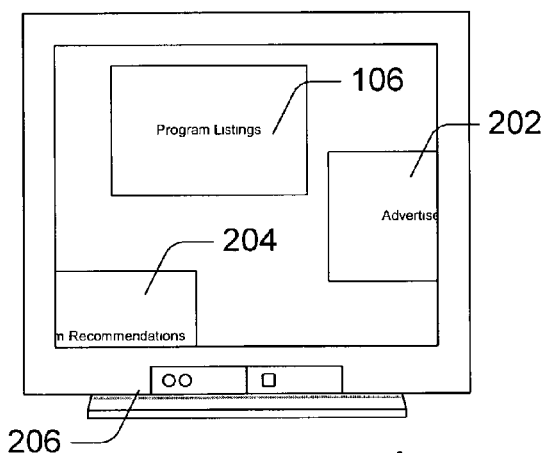
FIG. 2b illustrates a display of the two-dimensional plane within the three-dimensional graphics environment.

FIG. 2b illustrates an example display on display device 206 of the visible area illustrated in FIG. 2a.

Area 106 is defined as a two dimensional area, in which program listings are presented, such as a typical electronic program guide. Area 202 is defined as a two-dimensional area, in which advertisements are presented. Area 204 is defined as a two-dimensional area in which recommended programs are presented. As described with reference to FIG. 1, three-dimensional viewing environment 100 can include any number of two-dimensional areas for displaying any type of media or media data. Furthermore, although illustrated as being on the same plane, the multiple two-dimensional areas may each exist at any location within the thee-dimensional environment 100.

Figure 2C:
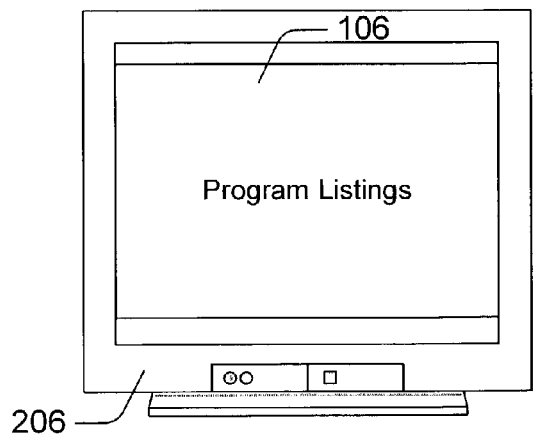
FIG. 2c illustrates a zoomed-in display of the two-dimensional plane within the three-dimensional graphics environment.

Using an input device, a viewer can zoom in or out, scroll in any direction, including up, down, left, and right, and rotate the viewing perspective in any direction. For example, to view only the program listings in area 106, a viewer can interact with the viewing environment 100 using an input device (e.g., a joystick or remote control) to zoom in on area 106 until area 106 fills the entire screen. FIG. 2c illustrates an example display after a viewer zooms in on two-dimensional area 106.

In one implementation, multiple two-dimensional areas can be used to allow a user to navigate between media content and related data that is made available to the viewer via triggers in the media content itself. For example, while viewing a football game, an icon may be rendered that indicates that commercial products associated with the teams that are playing are available for purchase. Using an input device, the viewer can select the icon, which then causes the viewer perspective within the three-dimensional viewing environment to change, bringing into view a second two-dimensional area. Through the new viewing perspective, the viewer can view a commercial for the available products, or in an alternate implementation, a website through which the viewer can purchase the products.

In one implementation, while the viewer is navigating through the additional data associated with the selected icon or trigger, the program that was originally being displayed is paused. The viewer can then resume viewing the program after navigating and experiencing the triggered additional content and/or data.

Presenting an EPG in Multiple Two-Dimensional Areas

EPG data can be categorized in many ways, such as according to program type (e.g., television series, movie, pay-per-view, sports program, etc.), according to genre (e.g., drama, romance, mystery, horror, comedy, etc.), according to intended audience (e.g., children, teen, men, women, adults, etc.), according to channel and/or time, and so on. By providing a viewer multiple ways to view EPG data, the viewer is able to quickly identify media content of interest.

Figure 3:
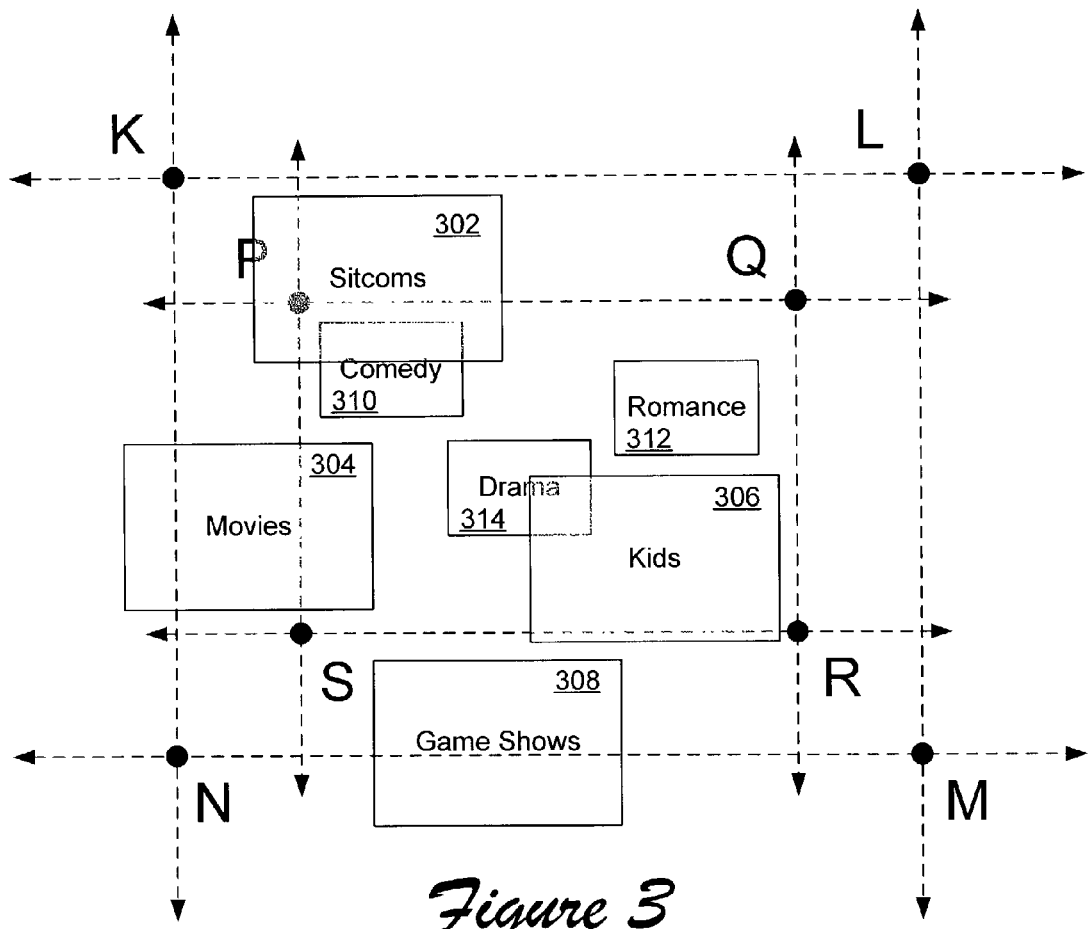
FIG. 3 illustrates an electronic program guide rendered using multiple two-dimensional areas within a three-dimensional environment.

FIG. 3 illustrates an exemplary display of EPG data using multiple two-dimensional areas within a three-dimensional viewing environment. In an exemplary implementation, EPG data is displayed across multiple two-dimensional areas, with each two-dimensional area representing, for example, a different category of data. The categories and layout of two-dimensional areas illustrated in FIG. 3 is only one example, and it is recognized that more and/or different data categorizations may be displayed in any number of configurations.

Points K, L, M, and N define a plane within a three-dimensional viewing environment 100. Points P, Q, R, and S define another plane within three-dimensional viewing environment 100. As illustrated in FIG. 3, plane PQRS is parallel to and, from the illustrated perspective, behind plane KLMN. Two-dimensional areas 302, 304, 306, and 308 are rendered in plane KLMN and two-dimensional areas 310, 312, and 314 are rendered in plane PQRS. As described above, with reference to FIGS. 1, 2a, 2b, and 2c, a viewer can navigate among the displayed two-dimensional areas using an input device, such as a joystick or game controller. For example, a viewer can zoom in on two-dimensional area 306 to view EPG data that describes programs that are appropriate for children. Similarly, a viewer can zoom past plane KLMN to zoom in on two-dimensional area 310 to view EPG data that describes programs that are categorized as comedies. Additionally, in the described implementation, two-dimensional areas may be arranged to take advantage of peripheral vision such that when a viewer is navigating within the three-dimensional viewing environment, the viewer may catch a glimpse of a portion of another panel near an edge of the screen, which may suggest the depth or variety of information available at other locations within the three-dimensional viewing environment.

Furthermore, information pertaining to a particular program may be displayed in multiple two-dimensional areas. For example, according to the configuration illustrated in FIG. 3, a movie that is a comedy may be represented in two-dimensional area 304 and also in two-dimensional area 310. In an alternate implementation, two-dimensional areas may also be defined such that each area displays detailed information about a particular program, rather than EPG data describing a category of programs.

Presenting Navigational Landmarks

Navigational landmarks may be rendered, along with media content and/or other data, to indicate that additional content and/or data is available to a viewer if the viewer navigates in a particular direction within the three-dimensional viewing area. In one implementation, the navigational landmarks may simply indicate that additional content or data is available by navigating in a particular direction. In an alternate implementation, the navigational landmarks may also indicate descriptive information about the type of data or content that is available.

Figure 4:
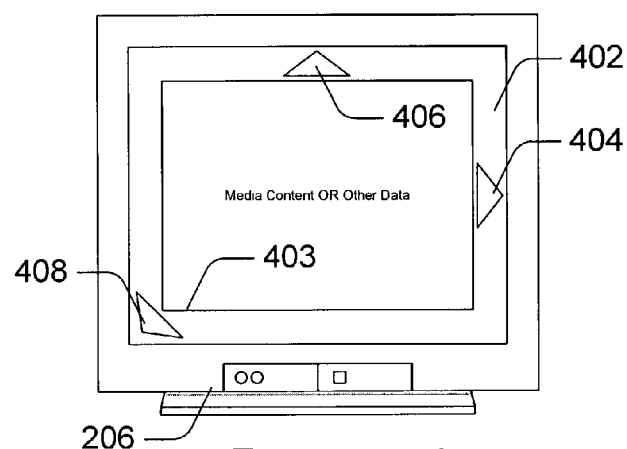
FIG. 4 illustrates the display of exemplary navigational landmarks.

FIG. 4 illustrates an example display in which navigational landmarks indicate the presence of additional data and/or content. Box 402 represents the screen area of a display device 206. Media content and/or other data (e.g., EPG data or advertisements) may be rendered within a two-dimensional area 403. Navigational landmarks 404, 406, and 408 are displayed to indicate to a viewer that additional two-dimensional areas for rendering media content or associated data are available if the viewer navigates (e.g., using a game controller, joystick, or other input device) in the direction indicated. For example, as illustrated in FIG. 4, navigational landmark 404 indicates that additional data or content is available to a viewer if the viewer navigates to the right while navigational landmark 406 indicates that additional data or content is available to a viewer if the viewer navigates up. Similarly, navigational landmark 408 indicates that additional data or content is available to a viewer if the viewer navigates down and to the left.

In one implementation, navigational landmarks are always visible to a viewer, providing a persistent reminder that additional content and/or data is available and an indication of how the viewer can navigate to the available content and/or data. In an alternate implementation, some or all of the navigational landmarks are displayed only when requested by a viewer, for example in response to the press of a button or movement of a joystick or other input device. Alternatively, a navigational landmark may be rendered when available data or content changes. For example, if an adjacent but out of view two-dimensional area is used to render broadcast media content, a navigational landmark may be automatically rendered for a short period of time (e.g., 30 seconds) when a new broadcast program begins in the available two-dimensional area.

Although illustrated in FIG. 4 as arrows, navigational landmarks may include any type of demarcation, including icons, text, colored indicators, and so on. Furthermore, text or audio may be associated with a navigational landmark to provide further information to the viewer regarding what type of content or data is available. For example, a user may press a remote control button to display navigational landmarks. If the user presses the button a second time, text associated with the navigational landmarks may be displayed as well to indicate, for example, that a listing of upcoming sports programs is available by navigating to the right, and a listing of upcoming movies is available by navigating to the left.

In one implementation, the viewer can customize the relative placement of two dimensional areas such that frequently accessed content and/or data is always easily available. For example, the viewer can customize a two-dimensional area for rendering program listing data for programs currently being broadcast to always be available when the viewer navigates to the left. Similarly, a default navigational directional can be defined so that regardless of where the viewer is navigating within the three-dimensional viewing environment, navigating in the default direction will always bring into view a two-dimensional area for viewing current broadcast media content. Furthermore, when customizing relative placement of two-dimensional areas, the viewer can choose to inactivate navigational landmarks associated with the customized directions, because the viewer will know, based on the customization, that a particular set of data or content is always available by navigating in a particular direction.

In addition to customizing the relative placement of particular two-dimensional areas, an input device may be programmed such that a particular input causes a particular two-dimensional area to be moved into the viewing area. For example, pressing a particular button on a remote control or game controller causes the viewer perspective to move within the three-dimensional area to bring the two-dimensional area that renders broadcast media content into view.

Exemplary Television Viewing System

Figure 5:
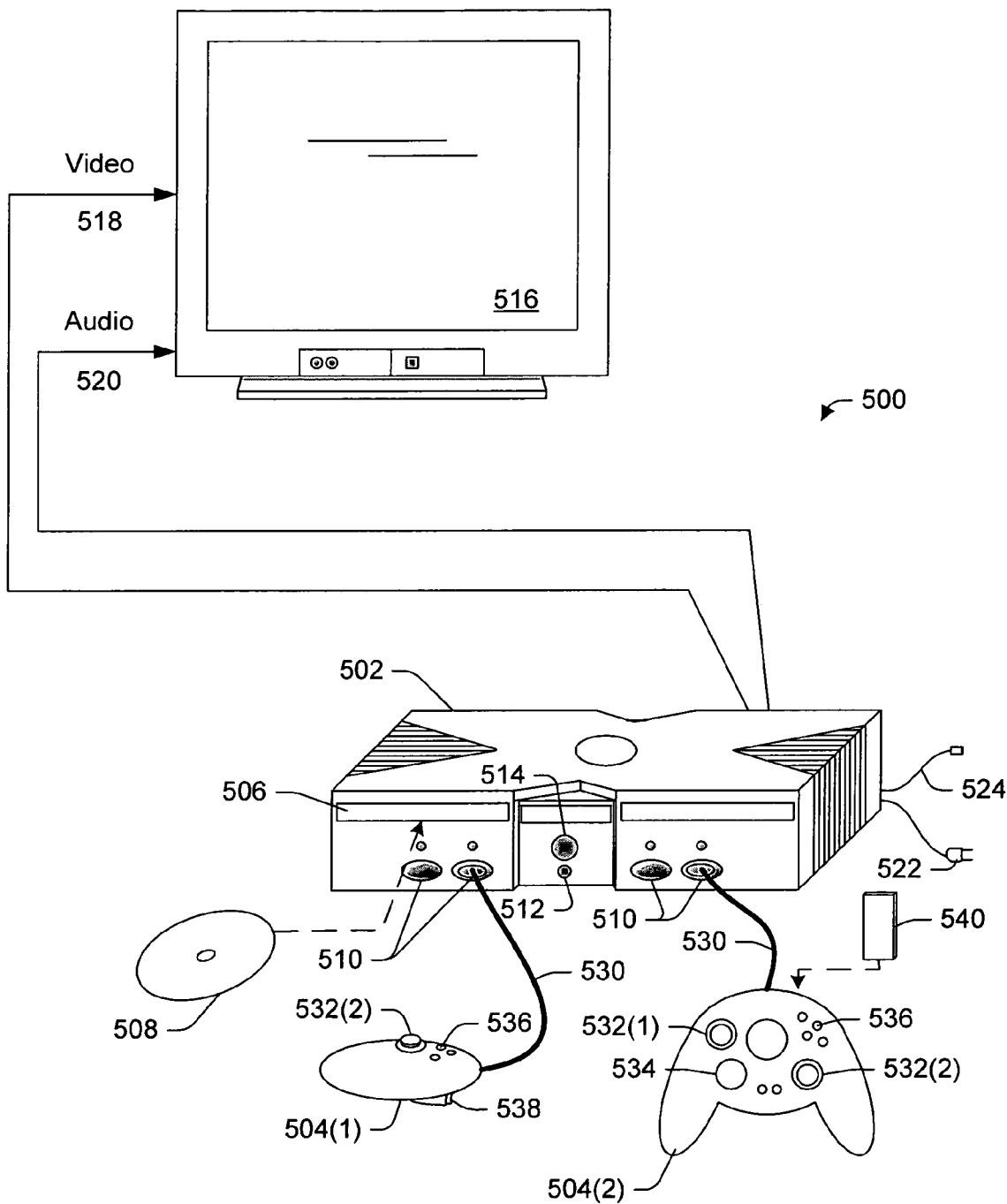
FIG. 5 illustrates components of an exemplary television viewing system that supports a three-dimensional television viewing environment.

FIG. 5 shows an exemplary television viewing system 500. System 500 includes a client device, such as gaming console 502 and up to four controllers, as represented by controllers 504(1) and 504(2). The game console 502 is equipped with an internal hard disk drive and a portable media drive 506 that supports various forms of portable storage media as represented by optical storage disc 508. Examples of suitable portable storage media include DVD, CD-ROM, game discs, and so forth.

The game console 502 has four slots 510 on its front face to support up to four controllers, although the number and arrangement of slots may be modified. A power button 512 and an eject button 514 are also positioned on the front face of the game console 502. The power button 512 switches power to the game console and the eject button 514 alternately opens and closes a tray of the portable media drive 506 to allow insertion and extraction of the storage disc 508.

The game console 502 connects to a television 516 or other display via A/V interfacing cables 518 and 520. A power cable 522 provides power to the game console. Cable or modem connector 524 facilitates access to a network, such as the Internet, a cable broadcast network, or a video-on-demand service.

Each controller 504 is coupled to the game console 502 via a wire or wireless interface. In the illustrated implementation, the controllers are USB (Universal Serial Bus) compatible and are connected to the console 502 via serial cables 530. Controller 504 may be equipped with any of a wide variety of user interaction mechanisms. As illustrated in FIG. 5, each controller 504 is equipped with two thumbsticks 532(1) and 532(2), a D-pad 534, buttons 536, and two triggers 538. These mechanisms are merely representative, and other known gaming mechanisms may be substituted for or added to those shown in FIG. 5. Each controller 504 provides a viewer with a mechanism for controlling a virtual viewer location 102 within a three-dimensional viewing environment 100.

A memory unit (MU) 540 may be inserted into the controller 504 to provide additional and portable storage. Portable memory units enable users to store game parameters and port them for play on other consoles. In the described implementation, each controller is configured to accommodate two memory units 540, although more or less than two units may be employed in other implementations.

Although shown and described as a game console, client device 502 may include any type of client device that includes a three-dimensional graphics processor and is capable of rendering three-dimensional images. For example, a television set-top box may be implemented with a three-dimensional graphics processor such that the set-top box may replace the game console illustrated in FIG. 5.

Exemplary Client Device

Figure 6:
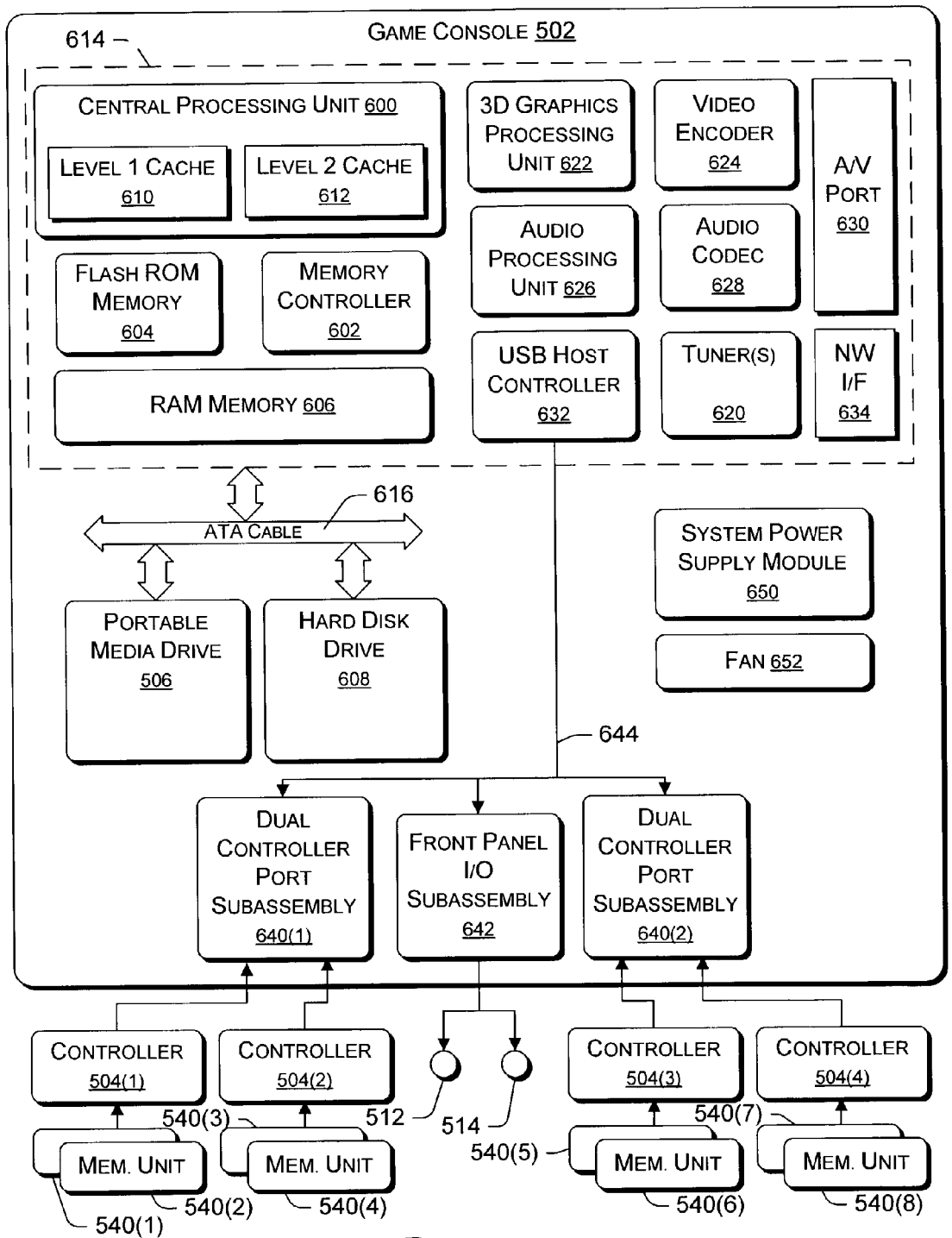
FIG. 6 illustrates select components of a client device implemented to support a three-dimensional television viewing environment.

FIG. 6 shows functional components of game console 502 in more detail. Game console 502 has a central processing unit (CPU) 600 and a memory controller 602 that facilitates processor access to various types of memory, including a flash ROM (Read Only Memory) 604, a RAM (Random Access Memory) 606, a hard disk drive 608, and the portable media drive 506. The CPU 600 is equipped with a level 1 cache 610 and a level 2 cache 612 to temporarily store data and hence reduce the number of memory access cycles, thereby improving processing speed and throughput.

The CPU 600, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 600, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 506 are connected to the memory controller via the PCI bus and an ATA (AT Attachment) bus 616.

One or more tuners 620 allow game console 502 to receive media content, as well as data that describes the media content, such as electronic program guide data. For example, the tuners 620 can be implemented to receive data over a satellite or cable broadcast network. Graphical media content and data that is received is processed using a 3D graphics processing unit 622 and a video encoder 624, which form a video processing pipeline for high speed and high resolution graphics processing. Data is carried from the graphics processing unit 622 to the video encoder 624 via a digital video bus (not shown). Corresponding audio content and data that is received is processed using an audio processing unit 626 and an audio codec (coder/decoder) 628, which form a corresponding audio processing pipeline with high fidelity and stereo processing. Audio data is carried between the audio processing unit 626 and the audio codec 628 via a communication link (not shown). The video and audio processing pipelines output data to an A/V (audio/video) port 630 for transmission to the television 206 or other display. In the illustrated implementation, the video and audio processing components 620-630 are mounted on the module 614.

Also implemented on the module 614 are a USB host controller 632 and a network interface 634. The USB host controller 632 is coupled to the CPU 600 and the memory controller 602 via a bus (e.g., PCI bus) and serves as host for the peripheral controllers 504(1)-504(4). The network interface 634 provides access to a network (e.g., Internet, home network, cable broadcast network, etc.) and may be any of a wide variety of various wire or wireless interface components including an Ethernet card, a modem, a Bluetooth module, a cable modem, and the like. The network interface 634 may be configured to enable the one or more tuners 620 to receive media content and data.

The game console 502 has two dual controller support subassemblies 640(1) and 640(2), with each subassembly supporting two game controllers 504(1)-504(4). Input received from a game controller 504 directs the 3D graphics processing unit 622 to perform the indicated visual navigation. A front panel I/O subassembly 642 supports the functionality of the power button 512 and the eject button 514, as well as any LEDs (light emitting diodes) or other indicators exposed on the outer surface of the game console. The subassemblies 640(1), 640(2), and 642 are coupled to the module 614 via one or more cable assemblies 644.

Eight memory units 540(1)-540(8) are illustrated as being connectable to the four controllers 504(1)-504(4), i.e., two memory units for each controller. Each memory unit 540 offers additional storage on which games, game parameters, and other data may be stored. When inserted into a controller, the memory unit 540 can be accessed by the memory controller 602.

A system power supply module 650 provides power to the components of the gaming console 502. A fan 652 cools the circuitry within the game console 502.

Exemplary Method for Rendering Media Content and Data

Figure 7:
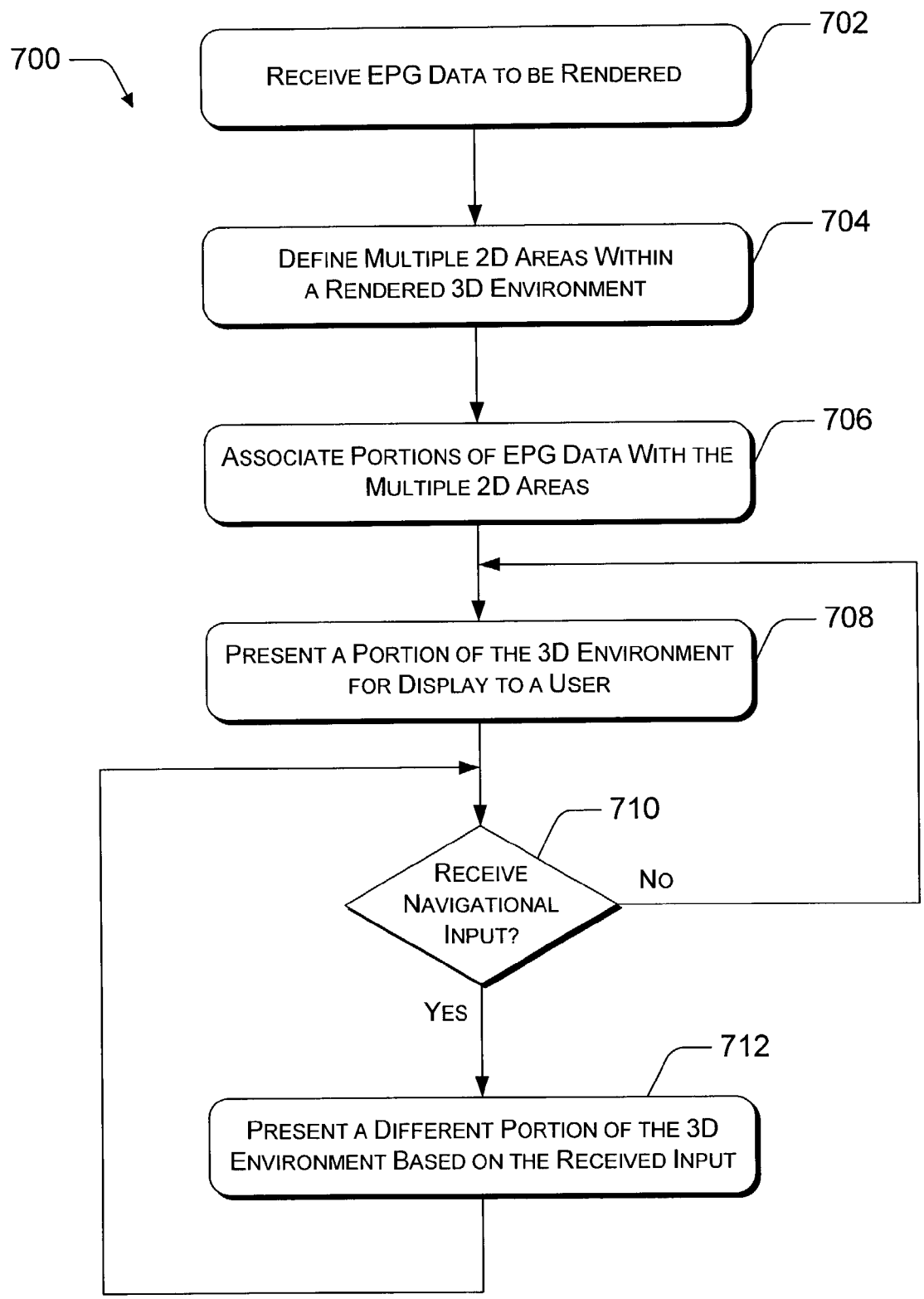
FIG. 7 illustrates a method for rendering EPG data in a three-dimensional television viewing environment.

FIG. 7 illustrates a method 700 for rendering EPG data within a three-dimensional television viewing environment. Rendering EPG data within a three-dimensional television viewing environment may be described in the general context of computer-executable instructions, such as application modules, being executed by a computer. Generally, application modules include routines, programs, objects, components, data structures, etc. that perform particular tasks or implement particular abstract data types. A three-dimensional television viewing environment for rendering EPG data may be implemented using any number of programming techniques and may be implemented in local computing systems or in distributed computing systems where tasks are performed by remote processing devices that are linked through various communications networks based on any number of communication protocols. In such a distributed computing system, application modules may be located in both local and remote computer storage media including memory storage devices. The method illustrated in FIG. 7 is described below with reference to components of the example computer system for implementing a three-dimensional television viewing environment that is illustrated in FIG. 5 and more particularly with reference to the exemplary components of client device 502 as illustrated in FIG. 6.

At block 702, client device 502 receives electronic program guide data to be rendered in a three-dimensional viewing environment. For example, tuner 620 receives electronic program guide data from a broadcast network.

At block 704, client device 502 defines multiple two-dimensional areas within a rendered three-dimensional environment. As shown in FIG. 1, areas 104, 106, 108, and 110 are multiple two-dimensional areas defined within a three-dimensional environment 100. Furthermore, the multiple two-dimensional areas can be any size and defined on any plane within a three-dimensional area.

At block 706, client device 502 associates portions of the received EPG data with the multiple two-dimensional areas. For example, the received EPG data may be associated with multiple categories, and each category then associated with a different two-dimensional area.

At block 708, client device 502 presents a portion of the rendered three-dimensional environment for display to a user. Because the three-dimensional television viewing environment is rendered using a display device 206, only a portion of the three-dimensional environment can be displayed at a time. As illustrated and described with reference to FIG. 1, the portion of the three-dimensional environment that is displayed is based on a virtual location and viewing direction 102 of a viewer within the three-dimensional environment. As the virtual location and viewing direction of a viewer moves, the portion of the three-dimensional environment that is displayed also changes.

At block 710 client device 502 determines whether or not a navigational input is being received. For example, a viewer submits navigational input to client device 502 using controller 504. The navigational input indicates how the viewer wishes to move the virtual location and viewing direction of the viewer within the three-dimensional environment. If the client device receives navigational input (the "Yes" branch from block 710), then the method continues a block 712. Otherwise (the "No" branch from block 710), the method continues presenting a portion of the three-dimensional environment as described with reference to block 708.

At block 712 client device presents a different portion of the three-dimensional environment for display to the user based on the received navigational input. For example, if the received navigational input indicates rotating to the right, then a portion of the three-dimensional environment that is to the right of the currently rendered portion is presented for display to the viewer.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   rendering a three-dimensional environment in which multiple two dimensional areas are defined, each said two dimensional area having electronic program guide data that identifies media content scheduled to be available to a user, wherein:
      a first two-dimensional area of the multiple two-dimensional areas and a second two-dimensional area of the multiple two-dimensional areas are rendered within a common two-dimensional plane;
      a third two-dimensional area of the multiple two-dimensional areas is rendered perpendicular to the first two-dimensional area;
      a fourth two-dimensional area of the multiple two-dimensional areas is rendered parallel to the first two-dimensional area; and
      a fifth two-dimensional area of the multiple two-dimensional areas is rendered such that it is neither:
         within the common two-dimensional plane;
         parallel to the first two-dimensional area; nor
         perpendicular to the first two-dimensional area;
   rendering program listings for media content associated with a first category of the electronic program guide data in a particular one of the two-dimensional areas;
   rendering program listings for media content associated with a second category of the electronic program guide data in another particular one of the two-dimensional areas;
   rendering detailed information about a particular media content in yet another particular one of the two-dimensional areas;
   identifying a virtual location and a virtual viewing direction of the user within the three-dimensional environment;
   displaying a portion of the three-dimensional environment via a display device, wherein:
      the portion of the three-dimensional environment that is displayed is determined based on the virtual location and the virtual viewing direction of the user; and
      the three-dimensional environment extends beyond the portion of the three-dimensional environment that is displayed, with reference to the virtual location and the virtual viewing direction of the user, in each of a plurality of directions, wherein the plurality of directions comprises:
         above;
         below;
         to the right;
         to the left; and
         behind;
   receiving a user-submitted location navigation command;
   in response to receiving the user-submitted location navigation command, modifying the virtual location of the user within the three-dimensional environment, thereby causing a different portion of the three-dimensional environment to be displayed;
   receiving a user-submitted viewing direction navigation command; and
   in response to receiving the user-submitted viewing direction navigation command, modifying the virtual viewing direction of the user within the three-dimensional environment, thereby causing another different portion of the three-dimensional environment to be displayed.

2. The method as recited in claim 1 wherein the first category is based on at least one of a genre, a program type, a target audience, a channel, a time of day, or a program topic.

3. The method as recited in claim 1 wherein the first category represents a genre selected from a group of genre comprising drama, comedy, mystery, and romance.

4. The method as recited in claim 1 wherein the first category represents a program type selected from a group of program types comprising television series, movie, game show, documentary, and educational program.

5. The method as recited in claim 1 wherein the user-submitted location navigation command is received via a game controller.

6. The method as recited in claim 1 wherein the user-submitted viewing direction navigation command is received via a game controller.

7. The method as recited in claim 1 wherein a program listing for a particular media content is simultaneously rendered in both the particular one of the two dimensional areas and the another particular one of the two dimensional areas, indicating that the particular media content is associated with both the first category and the second category.

8. One or more computer storage media comprising computer executable instructions that, when executed, direct a computing system to perform the method as recited in claim 1.

9. A game console configured to perform the method as recited in claim 1 further comprising a processor for executing instructions to perform the method and a memory.

* * * * *